United States Patent [19]
Aman et al.

[11] Patent Number: 5,473,773
[45] Date of Patent: Dec. 5, 1995

[54] APPARATUS AND METHOD FOR MANAGING A DATA PROCESSING SYSTEM WORKLOAD ACCORDING TO TWO OR MORE DISTINCT PROCESSING GOALS

[75] Inventors: Jeffrey D. Aman; Catherine K. Eilert, both of Wappingers Falls; Gary M. King, Millbrook; Bernard R. Pierce, Poughkeepsie; Peter B. Yocom, Wappingers Falls, all of N.Y.

[73] Assignee: International Business Machines Corporation, Armonk, N.Y.

[21] Appl. No.: 222,755

[22] Filed: Apr. 4, 1994

[51] Int. Cl.$^6$ .................................................. G06F 15/00
[52] U.S. Cl. ................................. 395/650; 364/DIG. 1; 364/281; 364/281.8
[58] Field of Search ................................. 395/600, 650, 395/700

[56] References Cited

U.S. PATENT DOCUMENTS

| | | | |
|---|---|---|---|
| 4,481,583 | 11/1984 | Mueller | 364/DIG. 1 |
| 4,633,387 | 12/1986 | Harting et al. | 364/DIG. 1 |
| 4,727,487 | 2/1988 | Masui et al | 364/DIG. 1 |
| 4,736,318 | 4/1988 | Delyani et al. | 364/DIG. 1 |
| 5,050,070 | 9/1991 | Chastain et al. | 364/DIG. 1 |
| 5,187,790 | 2/1993 | East et al. | 395/725 |
| 5,193,189 | 3/1993 | Flood et al. | 395/650 |
| 5,212,793 | 5/1993 | Donica et al. | 395/700 |
| 5,230,065 | 7/1993 | Curley et al. | 395/200 |
| 5,241,677 | 8/1993 | Naganuma et al. | 395/650 |

OTHER PUBLICATIONS

IEEE Transaction on Software Engineering, vol. SE-12 No. 10, Oct. 1986 "On Multisystem Coupling Through Function Request Shipping" by D. W. Cornell, et al. pp. 1006–1017.
IEEE Transactions on Software Engineering, vol. SE-12 #5 May 1986—"Adaptive Load Sharing in Homogeneous Distributed Systems" by D. L. Eager, et al. pp. 662–675.
"PAM—A Noniterative Approximate Solution Method for Closed Multichain Queueing Networks" by C. T. Hsieh, et al pp. 119–133, 1989.
IEEE Transactions on Computers, vol. C-34, #3, Mar. 1985 "Load Sharing in Distributed Systems" by Y. T. Wang, et al. pp. 204–217.
"Journal of the Association for Computing Machinery" vol. 32, No. 2, Apr. 1985 Optimal Static Load Balancing in Distributed Computer Systems by A. Tantawi, et al. pp. 445–465.
"Mainframe Journal" Jul. 1989–The Three Phases of Service Levels by C. Watson, pp. 42–43 & 82.
"IEEE Software Engneering" vol. 14, No. 9, Sep. 1988 Dynamic Transaction Routing in Distributed Database Systems by P. Yu, et al., pp. 1307–1318.
Proc. of 6th Int. Conf. on DCS, 1986 "On Coupling Partitioned Database Systems" by P. Yu, et al., pp. 148–157.
IBM Research Report (RC 15967) "Optimality & Finite Time Behavior of an Adaptive Multi–objective Scheduling Alogorithm" by P. Bhattacharya, et al., pp. 1–49, Jul. 1990.
IBM Patent Application Y09–92–020, Ser. No. 07/876,670 filed Apr. 30, 1992.

*Primary Examiner*—Thomas M. Heckler
*Attorney, Agent, or Firm*—William B. Porter; Lawrence D. Cutter

[57] ABSTRACT

A workload manager creates goal control data, defining two or more classes of system work units, in response to specification of goals of two or more goal types for the classes, and specification of importance values for each of the goal types. A system resource manager causes the goals to be met by periodically sampling work unit status; calculating a performance index for each class; selecting a receiver class to receive improved service based on the relative performance indexes and goal importance; a system bottleneck impacting achievement of goal by the receiver class is identified; and one or more system control data elements are identified and adjusted to cause the goal to be met for the receiver class.

24 Claims, 14 Drawing Sheets

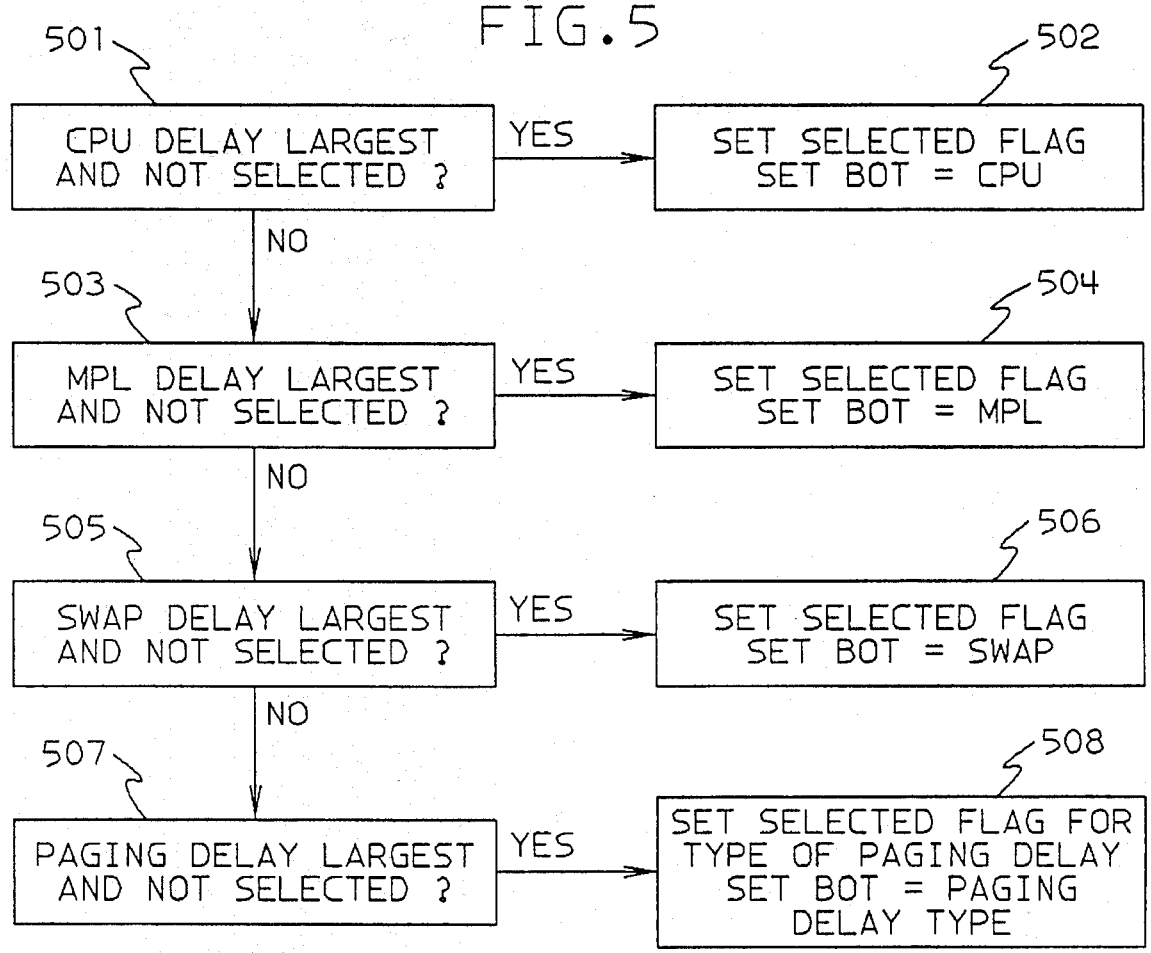

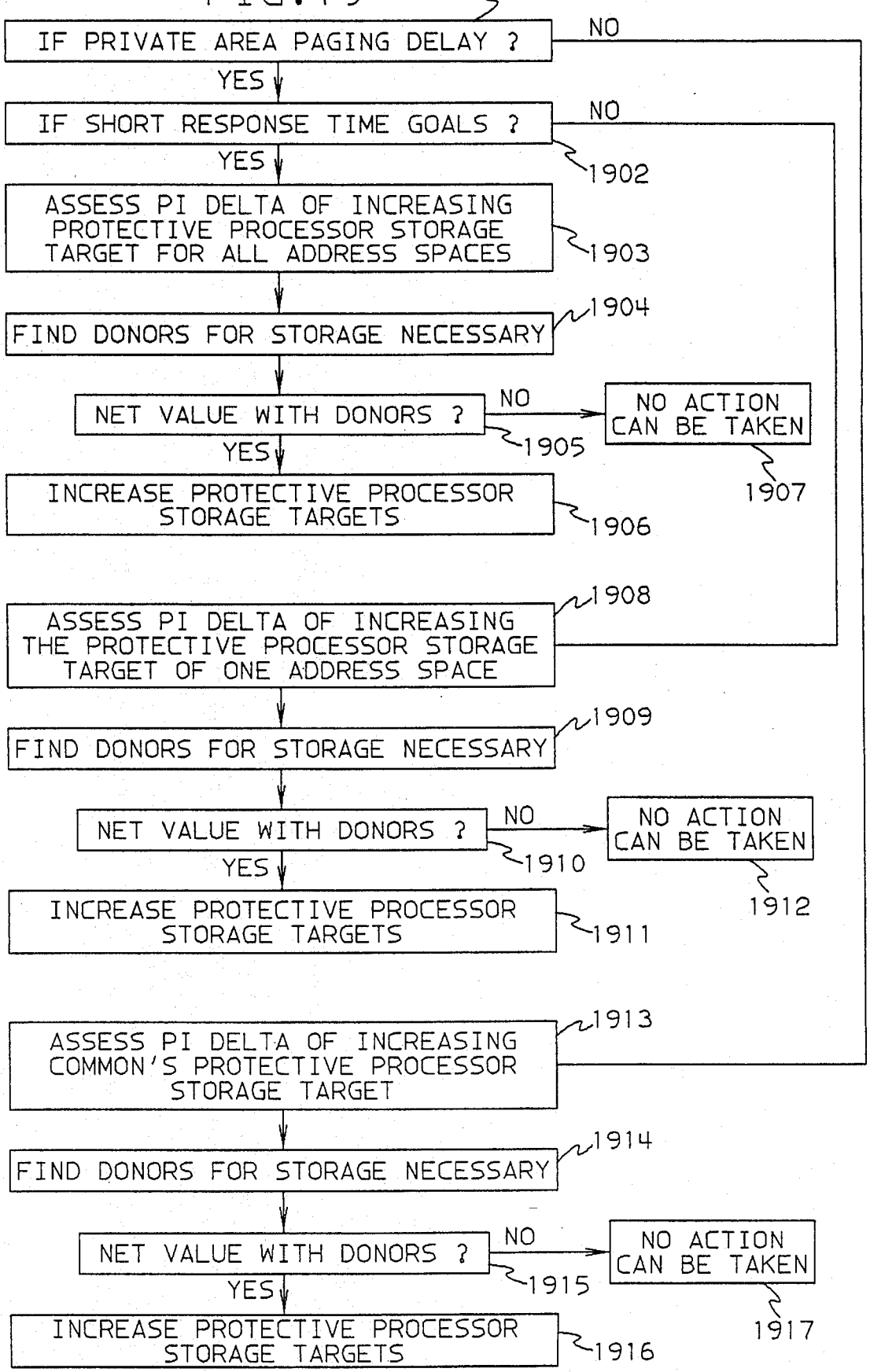

APPARATUS AND METHOD FOR MANAGING A DATA PROCESSING SYSTEM WORKLOAD ACCORDING TO TWO OR MORE DISTINCT PROCESSING GOALS

BACKGROUND OF THE INVENTION

Management of computer system performance has reached the point where the existing process controls are inadequate. The primary problem is one of complexity, given the large number of interrelated factors that affect actual achieved performance. In the past, some simplication was possible by allowing management of work units according to a single end-user oriented goal (e.g., response time). A critical unfulfilled requirement is that operating system software take over the responsibility for managing system performance according to more than one end-user oriented goal type, achieving the goals of the installation without requiring human intervention or specification of system performance parameters to guide such management.

SUMMARY OF THE INVENTION

This invention allows specification of a performance goal for each of a plurality of user performance goal classes. Exemplary goals may be specified in terms of response time or execution velocity. The importance of achieving the goal may also be specified with each goal. Given an awareness of the user performance goals, the operating system takes on responsibility for allocation of system resources to executing work such that those goals are best achieved. Tradeoffs are made to best utilize the available capacity, based on actual achievement toward goals and the types of resources required to achieve those goals.

BRIEF DESCRIPTION OF THE DRAWINGS

The detailed description explains the preferred embodiments of the present invention, together with advantages and features, by way of example with reference to the following drawings.

FIG. 4 illustrates the state data used to select resource bottlenecks.

FIG. 5 is a flowchart showing logic flow for the find-bottleneck function.

FIG. 19 is a flow chart showing the steps to take to reduce a receivers auxiliary storage paging delay.

DETAILED DESCRIPTION OF THE INVENTION

Figure 1:
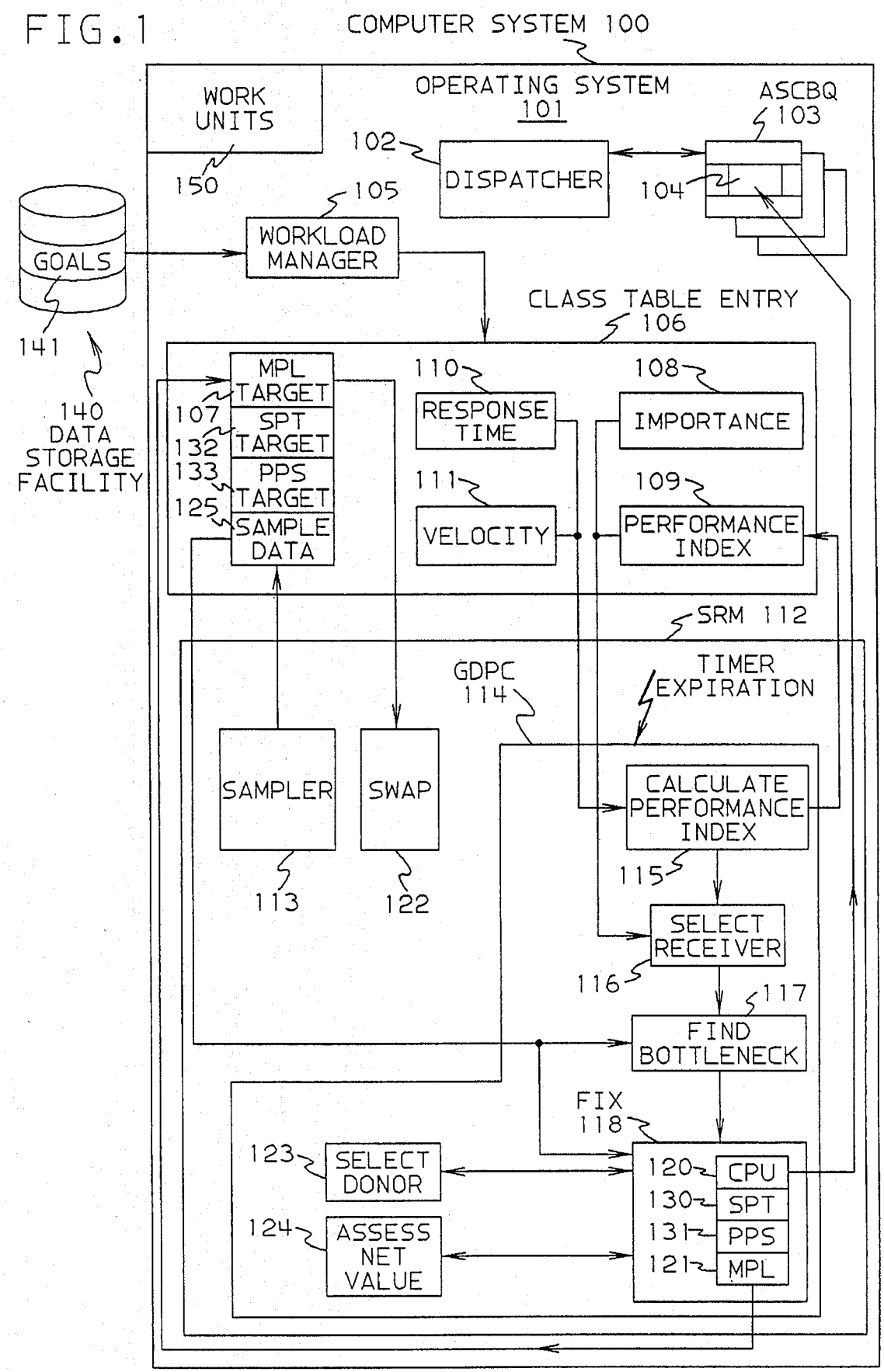
FIG. 1 is a system structure diagram showing particularly a computer system with its controlling operating system and system resource manager component adapted as described for the present invention.

FIG. 1 illustrates the environment and the key features of the present invention. (The present invention is related to the invention described in U.S. patent application Ser. No. 08/222,752 "Apparatus and Method for Managing a Server Workload According to Client Performance Goals in a Client/Server Data Processing System", by C. Eilert, et al., filed on Apr. 4, 1994, and assigned to the assignee of the present invention.) A computer system (100) is controlled by an operating system (101) such as IBM's MVS/ESA. A dispatcher (102) is a component of the operating system that selects the unit of work to be executed next by the computer. The units of work (150) are the application programs that do the useful work that is the purpose of the computer system. The units of work that are ready to be executed are represented by a chain of control blocks in the operating system memory called the address space control block (ASCB) queue (103). Each ASCB has a field that contains a relative importance (dispatching priority) value (104). The dispatching priority is set by operation of the present invention and used by the dispatcher to select to be executed the highest priority unit of work from those that are ready to be executed, as determined by the ASCB queue. The dispatching priority is a controlled variable provided by the present invention for meeting the stated performance goals for computer system operation.

The present invention takes as input the performance goals established by a system administrator and stored (141) on a data storage facility (140). The performance goals illustrated here are of two types: response time (in seconds) and execution velocity (in percent). Those skilled in the art will recognize that other goals, or additional goals, may be chosen without departing from the spirit or scope of this invention. Included with the performance goals is the specification of the relative importance of each goal. The goals (141) are read into the system by a workload manager (WLM) component (105) of the operating system. Each of the goals specified by the system administrator causes the workload manager to establish a performance class to which individual work units will be assigned. Each performance class is represented in the memory of the operating system by a class table entry (106). The specified goals (in an internal representation) and other information relating to the performance class are recorded in the class table entry. Among the more important information stored in a class table entry is the multiprogramming level (MPL) target value (107) (a controlled variable), the relative importance of the goal class (108) (an input value), the performance index (109) (a computed value), the response time goal (110) (an input value), the execution velocity goal (111) (an input value), and sample data (125) (measured data).

A system resource manager (SRM) component (112) of the operating system is modified according to the present invention to include a goal-driven performance-controller (GDPC) component (114) and to operate in the following manner as shown in FIG. 1. The GDPC performs the functions of measuring the achievement of goals, selecting the user performance goal classes that need their performance improved, and improving the performance of the user performance goal classes selected. The GDPC function is performed periodically based on a periodic timer expiration approximately every ten seconds in the preferred embodiment.

At (115), a performance index is calculated for each user performance goal class table entry (106) using the specified goal (110 or 111). The resulting performance index is recorded in the corresponding class table entry (106) at (109). The concept of a performance index as a method of measuring user performance goal achievement is well known. For example, in U.S. patent application Ser. No. 07/876,670, "Workload Manager for Achieving Transaction Class Response Time Goals in a Multiprocessing System", by D. Ferguson, et al., filed Apr. 30, 1992 and assigned to the assignee of the present invention, the performance index is described as the actual response time divided by the goal response time. This application is incorporated by reference hereby.

At (116), a user performance goal class is selected to receive a performance improvement in the order of the relative goal importance (108) and the current value of the performance index (109). The selected user performance goal class is referred to as the receiver.

The performance bottleneck is determined (117) relative to the controlled variables by using state samples (125), a well known technique. The controlled variables are protective processor storage target (affects paging delay), swap protect time target (affects swap delay), multiprogramming level (MPL) target (affects MPL delay), (107) and dispatch priority (104) (affects CPU delay).

At (118), the potential changes to the controlled variables are considered. A user performance goal class is selected (123) for which a performance decrease can be made based on the relative goal importance (108) and the current value of the performance index (109). The selected user performance goal class is referred to as the donor. Next, the proposed changes are assessed (119) for net value relative to the expected changes to the performance index for both the receiver and the donor for each of the controlled variables (dispatch priority (120) (107), the swap protect time target (130) (132), the protective processor storage target (131) (133), and the MPL target (121) (107). That is, if the result will yield more improvement for the receiver than harm to the donor relative to the goals, then the respective controlled variable is adjusted for both the donor and the receiver.

The goal driven performance controller (GDPC) function is performed periodically, (once every ten seconds in the preferred embodiment) and is invoked via a timer expiration. The functioning of the GDPC provides a feedback loop for the incremental detection and correction of performance problems so as to make the operating system adaptive and self-tuning.

PRIMARY PROCESSING STEPS

Figure 2:
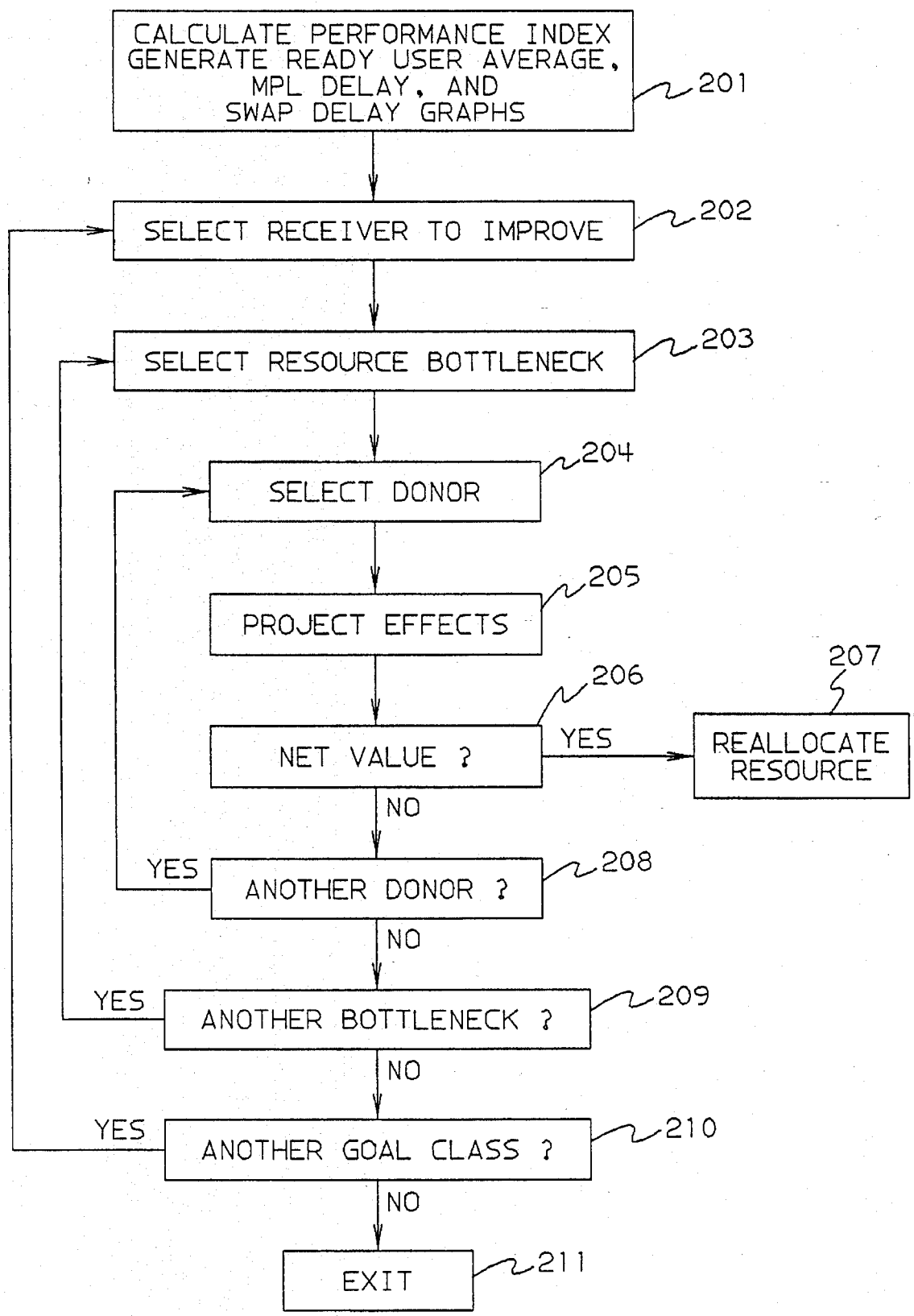
FIG. 2 is a flowchart showing the overall logic flow in the goal-driven performance-controller component.
Figure 18:
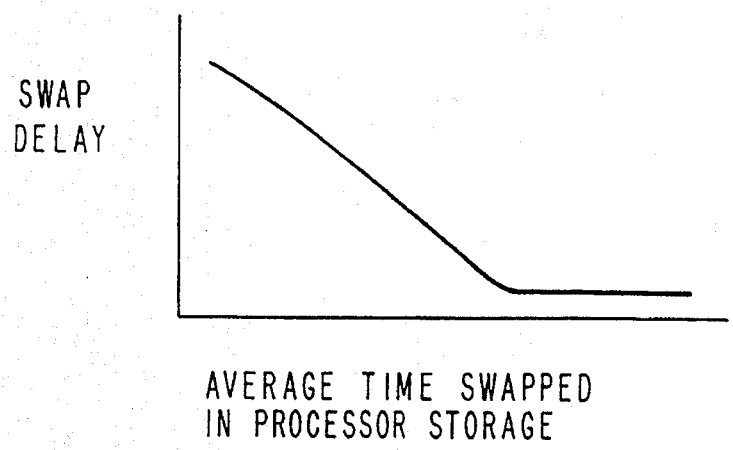
FIG. 18 is a sample graph of swap delay.

FIG. 2 is a flowchart showing the logic flow for the primary processing steps of the goal driven performance controller (GDPC) of the present invention. At (201), a performance index is calculated for each user performance goal class and the current values are calculated for the ready-user-average graph (FIG. 15), the MPL-delay-graph (FIG. 16), and swap-delay graph (FIG. 18). (The performance index calculation is described below.) At (202), a user performance goal class, referred to as the receiver, is selected to have its performance improved. The selection process is shown in more detail in FIG. 3. At (203), one of the receiver's resource bottlenecks is selected as the bottleneck to address. Bottleneck selection is shown in more detail in FIG. 5. At (204), user performance goal classes that own the resource identified as required to improve the performance of the receiver are selected. These selected user performance goal classes are referred to as donors. Donors are selected in reverse order to receivers, that is, the user goal classes having the best performance indexes and least importance are selected. Donor selection is shown in more detail in FIG. 6.

At (205), the effects of the resource reallocation from the donor to the receiver are projected. The algorithms used to project the effects of resource reallocation depend on the resource involved. Each of the algorithms is described below in this specification. At (206), the net value of reallocating the resource from the donor or donors to the receiver is assessed. A receiver will only be improved by reallocating resource from a specific donor if there is projected to be net positive value to the resource reallocation. If using a donor to improve a receiver is projected to result in more harm to the donor than improvement to the receiver relative to the goals and importance, the resource reallocation is not done. Net value assessment is shown in more detail in FIG. 8.

If there is net positive value to the reallocation, the resources are reallocated from the donor or donors to the receiver at (207). If there is not net positive value, a check is made at (208) to determine whether there is another potential donor.

If there is another potential donor, control passes to (204) to select another potential donor. If there are no more potential donors of the resource required to address the selected bottleneck, a check is made at (209) to determine whether the receiver has another bottleneck.

If the receiver has another bottleneck that can be addressed, control returns to (203) to select another bottleneck. If the receiver has no more bottlenecks to address, a check is made at (210) to determine whether there is another potential receiver.

If there is another potential receiver, control returns to (202) to select another potential receiver. If there are no more potential receivers, the goal driven performance controller function is complete for the present iteration (211).

The GDPC function will be invoked again when the timer next expires, providing feedback on the effect of the resource reallocations made previously and again providing the opportunity to address performance problems.

PERFORMANCE INDEX

The performance index is calculated (115) for execution velocity goals (111) as follows: (execution velocity goal)/(actual execution velocity)

The performance index is calculated (115) for response time goals (110) as follows: (actual response time)/(response time goal)

Execution velocity is the time work in the user goal performance class is running, divided by the time work is running or delayed, expressed as a percentage. The performance index is the goal divided by the actual execution velocity for work with execution velocity goals and actual response time divided by the response time goal for work with response time goals.

A performance index of 1.0 indicates the user performance goal class is exactly meeting its goal. A performance index greater than one indicates the class is performing worse than its goal, and a performance index less than 1.0 indicates the class is performing better than its goal.

For response time goals, the performance index is calculated from enough recent response completions to be representative of the results for the class. For example, the preferred embodiment takes samples for thirty seconds or accumulates ten samples, whichever is less. For each in-flight work unit a projected response time is calculated using the following steps:

1. Find the average amount of service used by work units assigned to the same goal class that completed with more service time than the work unit in question has used so far.
2. Subtract the amount of service time the work unit has used so far from this average to get a projection for the amount of additional service time the work unit will use.
3. Divide the projection for addition service time by the rate the work unit is accumulating service time to get a projection for the time until the work unit completes.
4. Add the projection for the time until the work unit completes to the length of time the work unit has already run to get the projection for the work units response time.

The projected response times for in-flight work are combined with data from the actual response completions to calculate the performance index.

For execution velocity goals, the execution velocity is calculated from recent state sample data. The sample set is built up from samples collected over a long enough period of time to get a representative picture of where the unit of work spends its time. This time interval may vary depending on the activity in the class. Very recent samples are weighted more in building the sample set. These sampling techniques are well known in the art. The preferred embodiment, for example, uses a collection interval of at least thirty seconds and five hundred non-idle samples. The samples from the last 10 seconds of the collection interval are given twice the weight of the earlier samples.

SELECT RECEIVER TO IMPROVE

Figure 3:
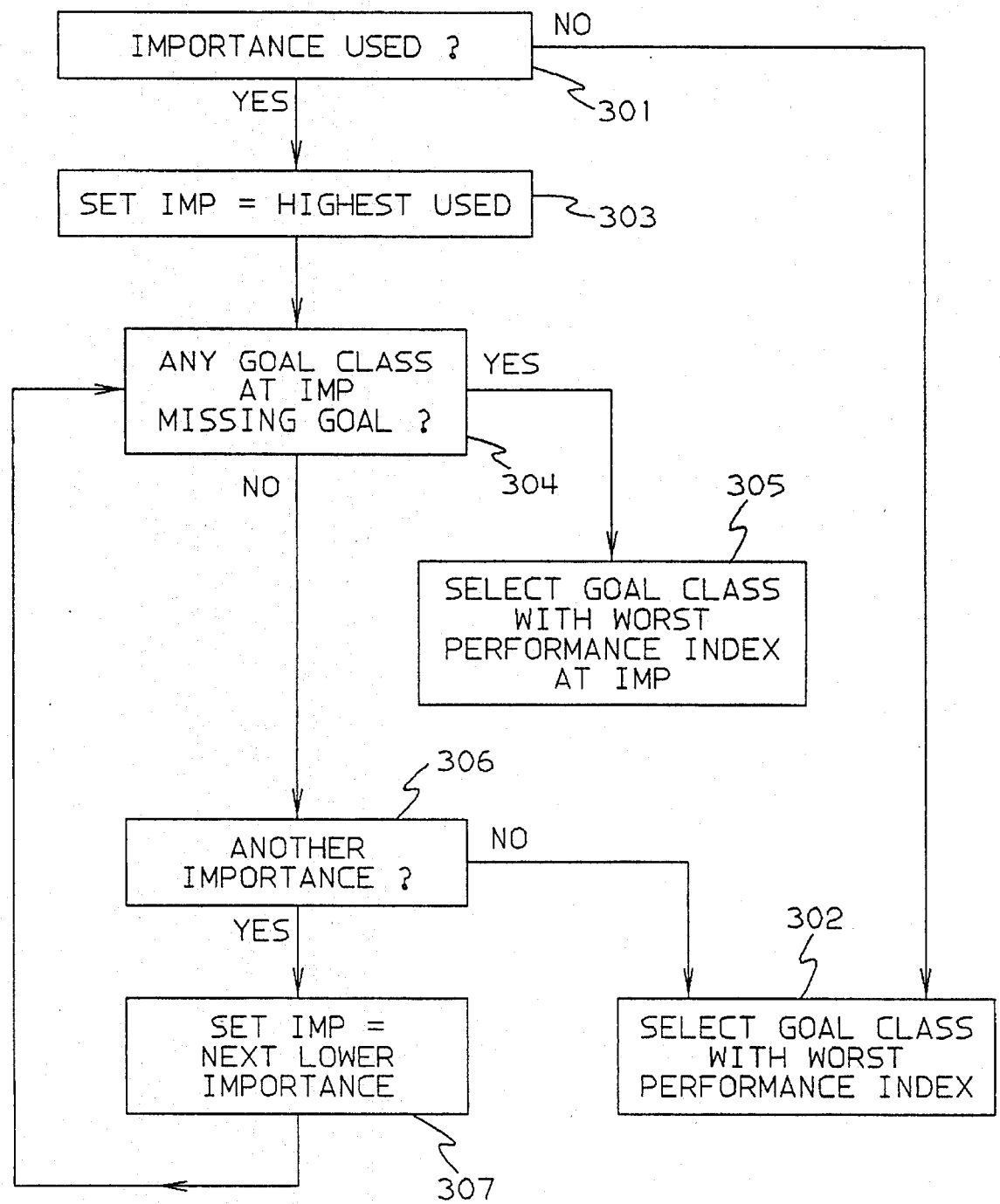
FIG. 3 is a flowchart showing logic flow for the select-receiver function.

FIG. 3 shows a flow chart of the logic flow for selecting a performance goal (116) class to receive a performance improvement. At (301) the performance goal class table is searched to determine whether any entries have an associated importance value. Importance values are optional when the specifying the performance goals. If no importance values have been specified for any of the goal classes, the goal class having the worst (highest) performance index is selected (302). If importance values have been specified, the importance value to be considered is initialized to highest importance value specified for any performance goal class (303). At the importance being considered, all performance goal classes having that importance are assessed for underachieving their respective performance goal (304). The worst underachiever at the importance value being considered, if any, is selected as the receiver (305). If there are no underachieving performance goal classes at the importance being considered (304), then if another, lower importance value has been specified (306), the next lower importance value specified is set to be considered (307) and control returns to (304). If there are no underachieving performance goal classes at all, then the worst-performing performance goal class is selected as the receiver (302), as if no importances were used.

FIND BOTTLENECK

FIG. 4 illustrates the state data used to select resource bottlenecks (117) to address. For each delay type, the performance goal class table entry contains the number of samples encountering that delay type and a flag indicating whether the delay type has already been selected as a bottleneck during the present invocation of the goal driven performance controller. In the case of the cross-memory-paging type delay, the class table entry also contains identifiers of the address spaces that experienced the delays.

The logic flow of the find bottleneck function is illustrated in FIG. 5. The selection of a bottleneck to address is made by selecting the delay type with the largest number of samples that has not already been selected during the present invocation of the goal driven performance controller. When a delay type is selected, the flag is set so that delay type is skipped if the find bottleneck function is reinvoked during this invocation of the goal driven performance controller.

In FIG. 5 at (501), a check is made to determine whether the CPU delay type has the largest number of delay samples of all the delay types that have not yet been selected. If yes, at (502), the CPU delay selected flag is set and CPU delay is returned as the next bottleneck to be addressed. At (503) a check is made to determine whether the MPL delay type has the largest number of delay samples of all the delay types that have not yet been selected. If yes, at (504), the MPL delay selected flag is set and MPL delay is returned as the next bottleneck to be addressed. At (505) a check is made to determine whether the swap delay type has the largest number of delay samples of all the delay types that have not yet been selected. If yes, at (506), the swap delay selected flag is set and swap delay is returned as the next bottleneck to be addressed.

At (507) a check is made to determine whether the paging delay type has the largest number of delay samples of all the delay types that have not yet been selected. If yes, at (508), the paging delay selected flag is set and paging delay is returned as the next bottleneck to be addressed. There are five types of paging delay. At step (507), the type with the largest number of delay samples is located, and at (508), the flag is set for the particular type and the particular type is returned. The types of paging delay are: private area, common area, cross memory, virtual input/output (VIO), and hiperspace each corresponding to a page delay situation well known in the environment of the preferred embodiment (MVS/ESA).

FIXING DELAY

This section describes in particular how the receiver performance goal class performance is improved by changing a controlled variable to reduce the delay selected by the find bottleneck function.

GENERAL FIX FLOW

Figure 7:
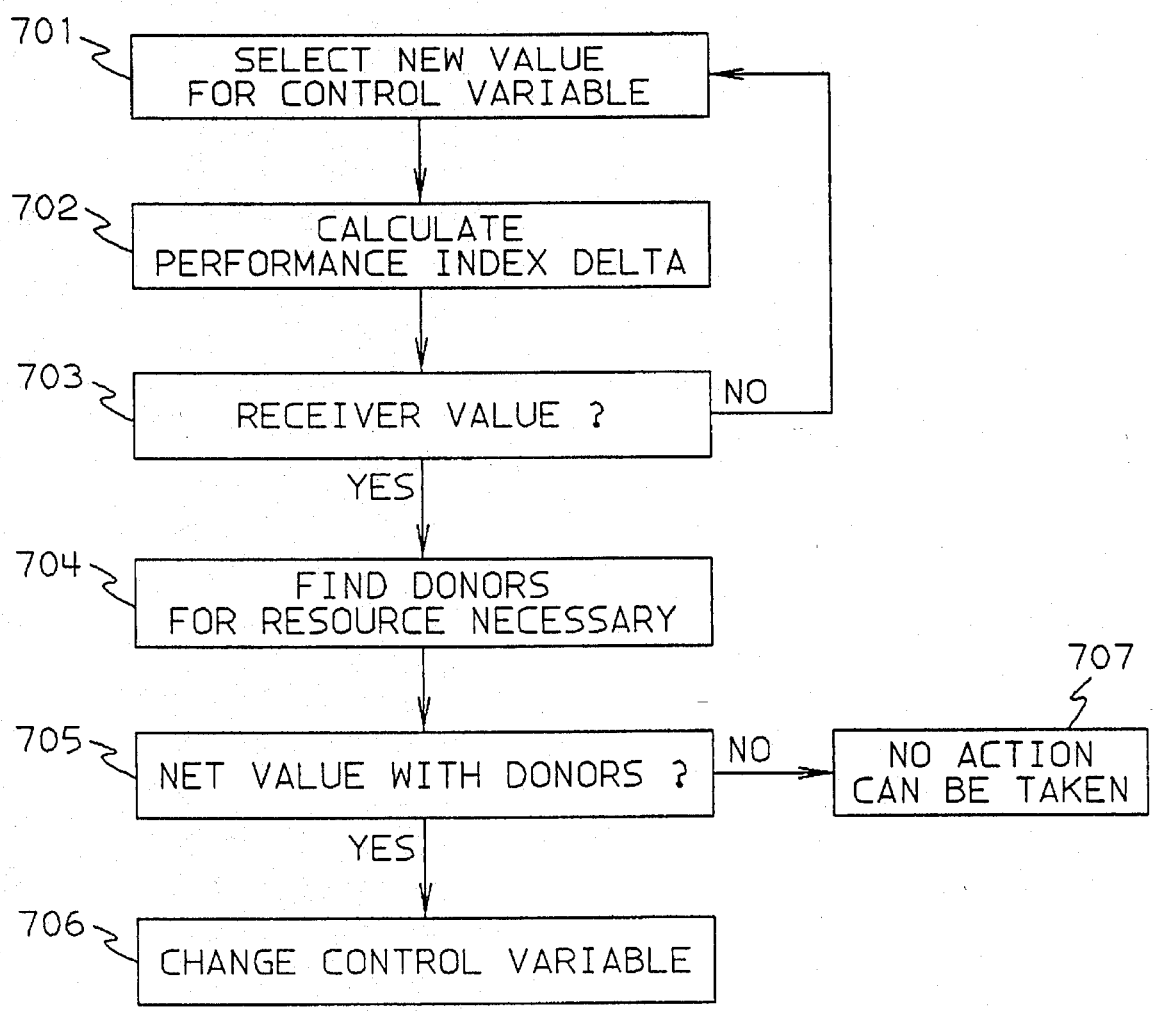
FIG. 7 is a flowchart showing logic flow for the fix function.

FIG. 7 illustrates the steps required by FIX (118) to assess improving a receiver goal class performance by changing the controlled variable related to the chosen resource bottleneck. At (701), a new value is chosen for the controlled variable. At (702), the change to the performance index is calculated for the receiver performance goal class. The details of this calculation are specific to individual resources and are described below. At (703), the improvement in the performance index is checked to determine whether the change results in sufficient value to the receiver. If there is not sufficient receiver value, control returns to (701) where a value is chosen for the controlled variable that will result in greater benefit for the receiver.

When there is sufficient receiver value, control passes to (704) where select donor is called to find donors of the resource needed to make the control variable change. At (705), a check is made to see if the proposed change has net value. For the change to have net value the benefit to the receiver in relation to goals and importance must be more than the harm to the donors. If the proposed change does have net value, the controlled variable is changed at (706). If there is not net value, the chosen resource bottleneck cannot be fixed (707).

SELECT DONOR

Figure 6:
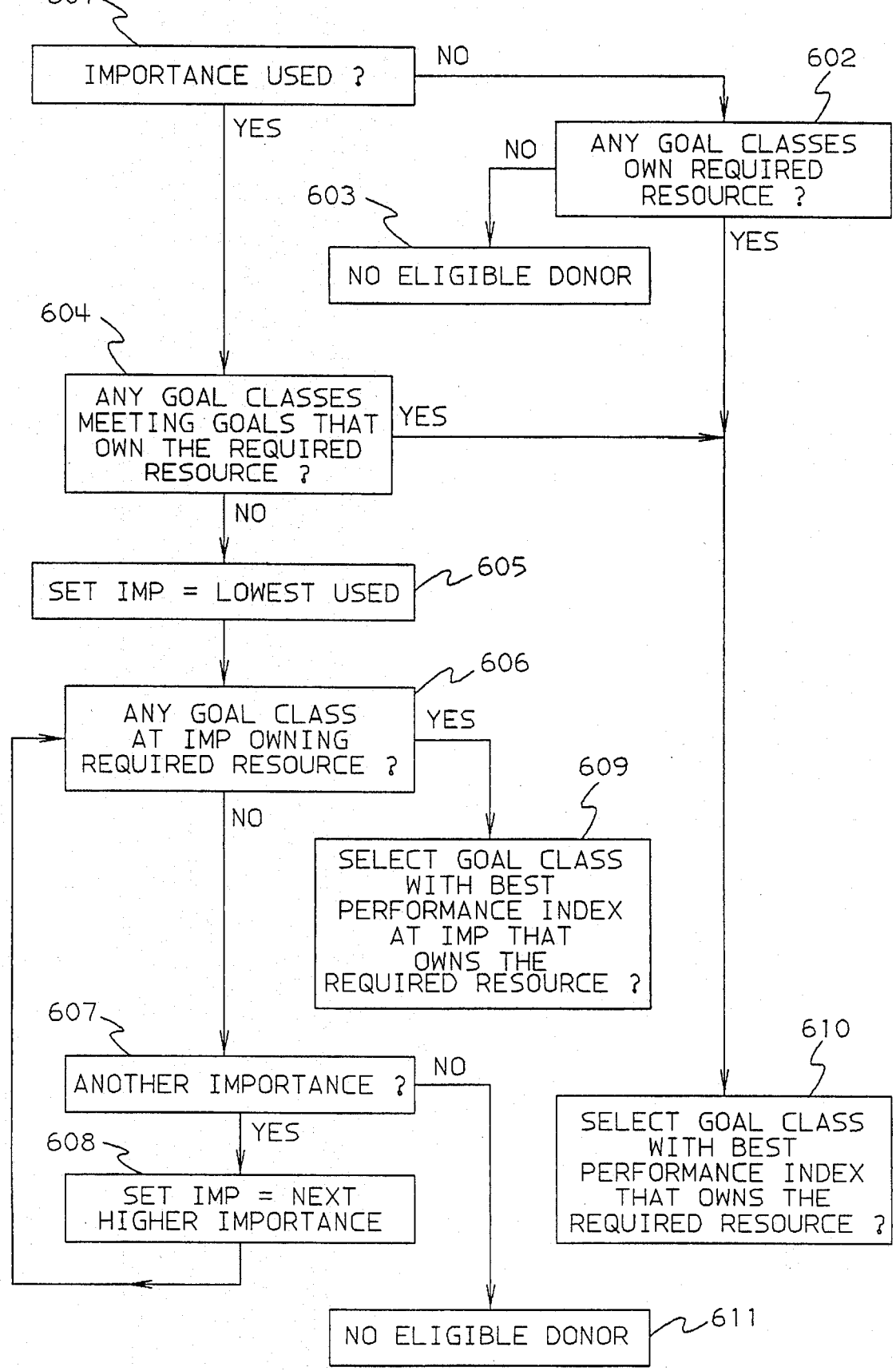
FIG. 6 is a flowchart showing logic flow for the select-donor function.

FIG. 6 is a flowchart showing logic flow for the select-donor function (123). The purpose of the select-donor function is to choose from the set of goal classes that own the required resource the most eligible goal class to donate that resource to the receiver. At (604) select donor determines whether there are any goal classes that are meeting goals and own the required resource. If there are such goal classes, select donor chooses as the donor the goal class with the best performance index (610). Importance is not used to differentiate among goal classes meeting their specified goals. If there is no goal class that is both meeting its goal and that owns the required resource, select donor finds the goal classes that have the lowest specified importance value and that own the required resource (605–608). If such a set of goal classes exists, select donor chooses that goal class with the best performance index (609). If there is not at least one such goal class, then there is no eligible donor in the system (611).

ASSESS NET VALUE

Figure 8:
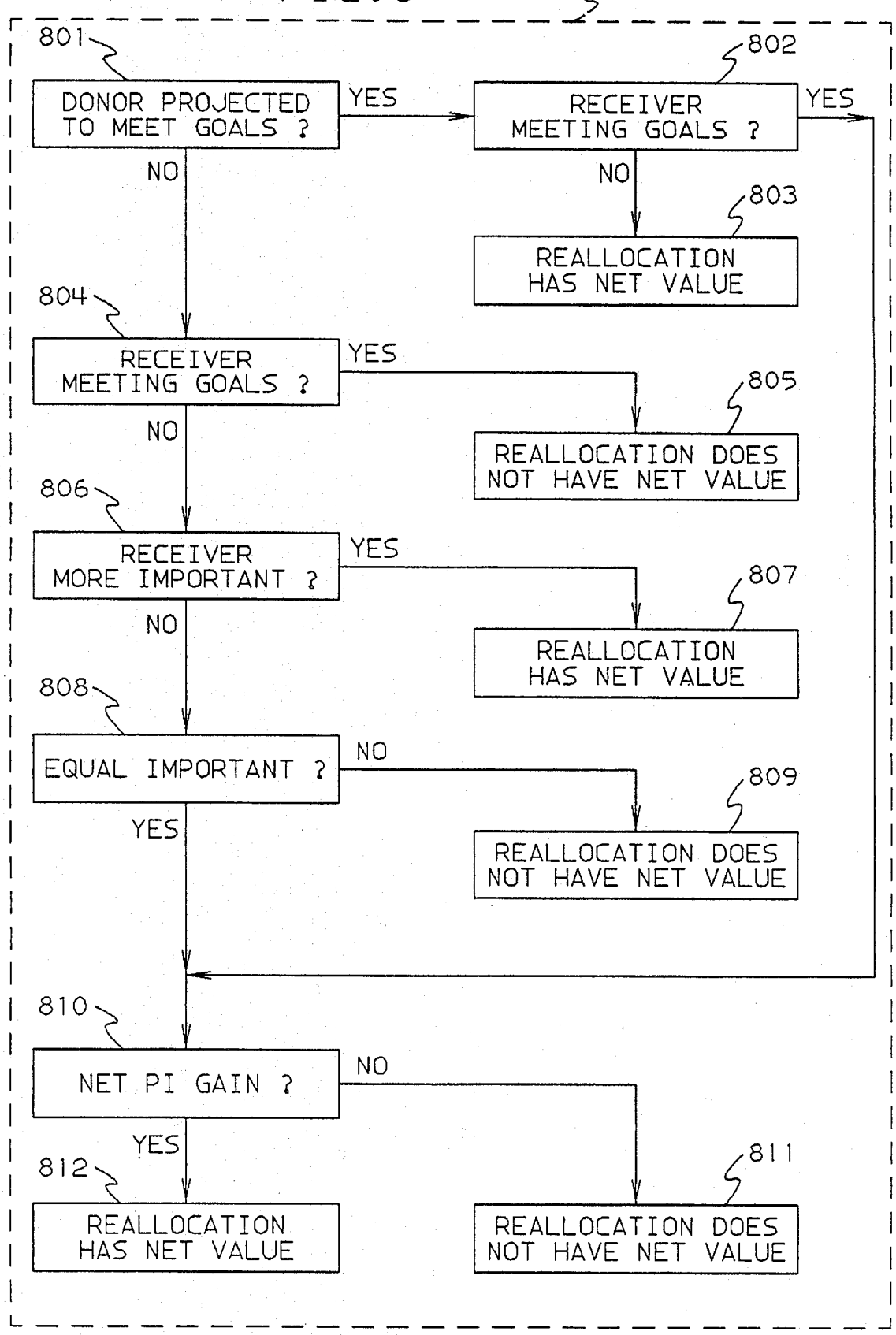
FIG. 8 is a flowchart showing the general logic flow for the assess-net-value function for proposed changes.

FIG. 8 illustrates the steps used to determine the net value (124) of a reallocation of resources between the receiver and the donor. If the resource donor is projected to meet its goal (801) and the receiver is missing its goal (802), the reallocation has net value (803). If the donor is projected to miss its goals and the receiver is meeting its goals the action does not have net value (805). If both the donor and the receiver are missing goals, the reallocation has net value if the receiver is more important (as indicated by the importance value (108)) than the donor (807) and does not have net value if the donor is more important the receiver (809). At (810) either both the receiver and donor are missing goals and are equally important or both are meeting goal. In this case the reallocation has net value if it causes a net performance index (PI) gain. A resource reallocating has a net performance index gain if both of the following conditions are true:

1. The projected performance index value decrease (performance improvement) for the receiver is more than the projected performance index value increase (performance degradation) of the donor.
2. If the receiver is projected to have a lower performance index value (better performance) than the donor, the receiver's performance index value must be projected to be closer to the donor's performance index value after the reallocation than before.

For item 1 above, when comparing the projected performance index decrease of the receiver to the projected performance index increase of the donor, the receiver only gets credit for the part of its performance index value decrease above 0.90. Similarly, the donor only gets credit for the part of its performance index value increase above 0.90. For example, if the receiver's performance index value was projected to improve from 1.50 to 0.70, the performance index decrease used in the comparison would be 0.60.

RECEIVER VALUE

Checking for sufficient receiver value is an optimization. A receiver will only be helped if there is projected to be sufficient receiver value. Receiver value is a minimum performance index improvement criteria, for example, 10 percent of the difference between the receiver's current performance index and 1.00, designed to reject very small improvements. The reason to reject actions for too little receiver value is to avoid making changes that yield only marginal improvements.

CPU DELAY

This section describes improving performance by reducing the CPU delay (120) experienced by the receiver.

Figure 9:
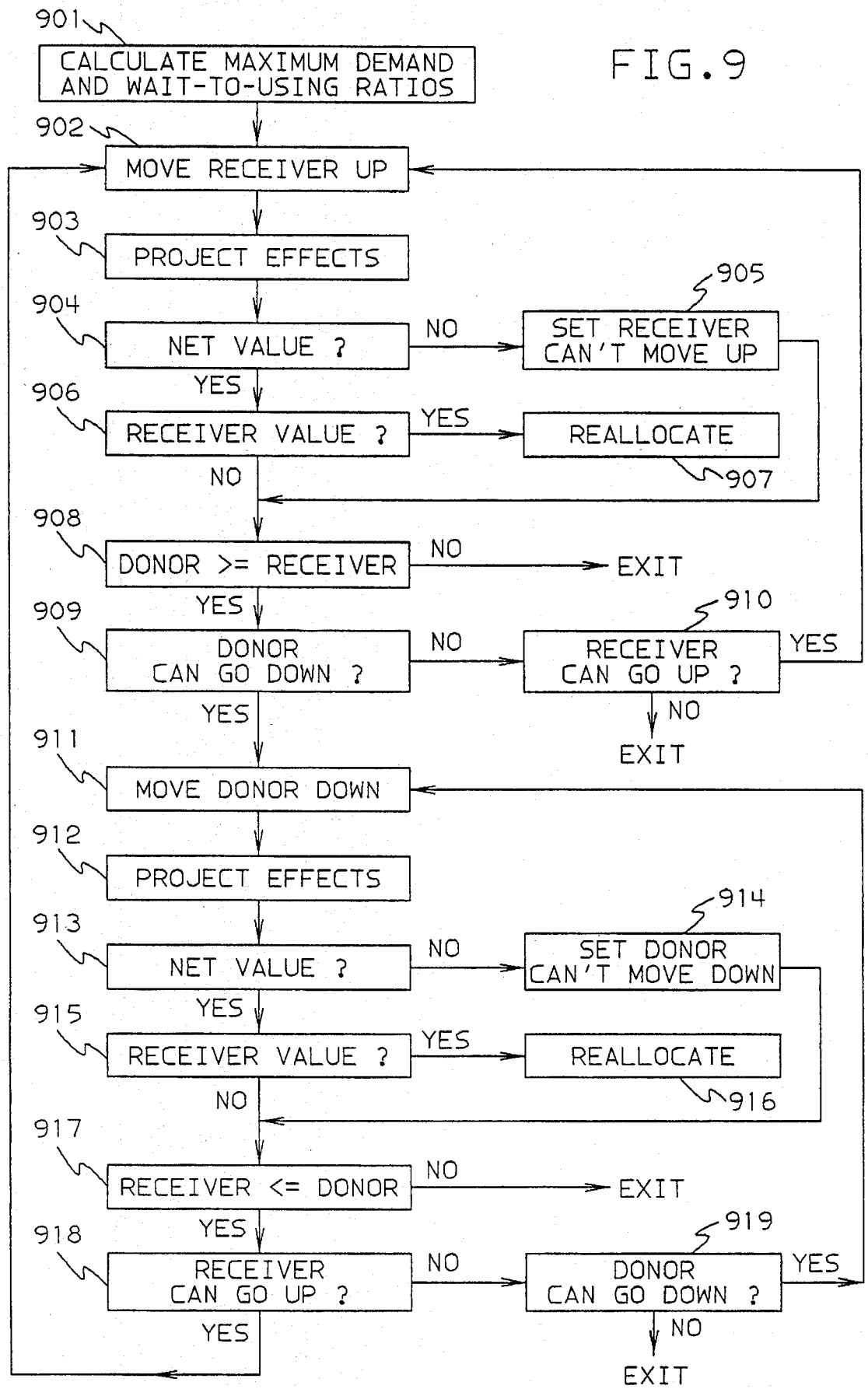
FIG. 9 is a flowchart of the steps to assess improving performance by increasing dispatch priority.

FIG. 9 illustrates the steps to find a new set of dispatching priorities to be used to improve the receiver's performance without inequitably harming the donor's performance. FIGS. 9–13 provide the steps involved in making the performance index delta projections provided by fix (118) to assess net value (124).

At (901), the maximum demand and wait-to-using ratios are calculated for each goal class and accumulated for all the goal classes at each priority. These calculations are described below in the specification. A table of these values is constructed where each row represents the dispatch priority and the two columns are the wait-to-using ratio and the maximum demand, accumulated for all the performance goal classes at the corresponding dispatch priority value. This table is called the wait-to-using table and is used to project new wait-to-using values for a new dispatch priority, as described later. Wait-to-using ratios (CPU delay samples divided by CPU-using samples) are a well known concept in computer systems performance measurement. Maximum demand is new. Maximum demand is the theoretical maximum percentage of total processor time that a service period can consume if it has no CPU delay. The maximum demand calculation is shown later in this specification.

Figure 10:
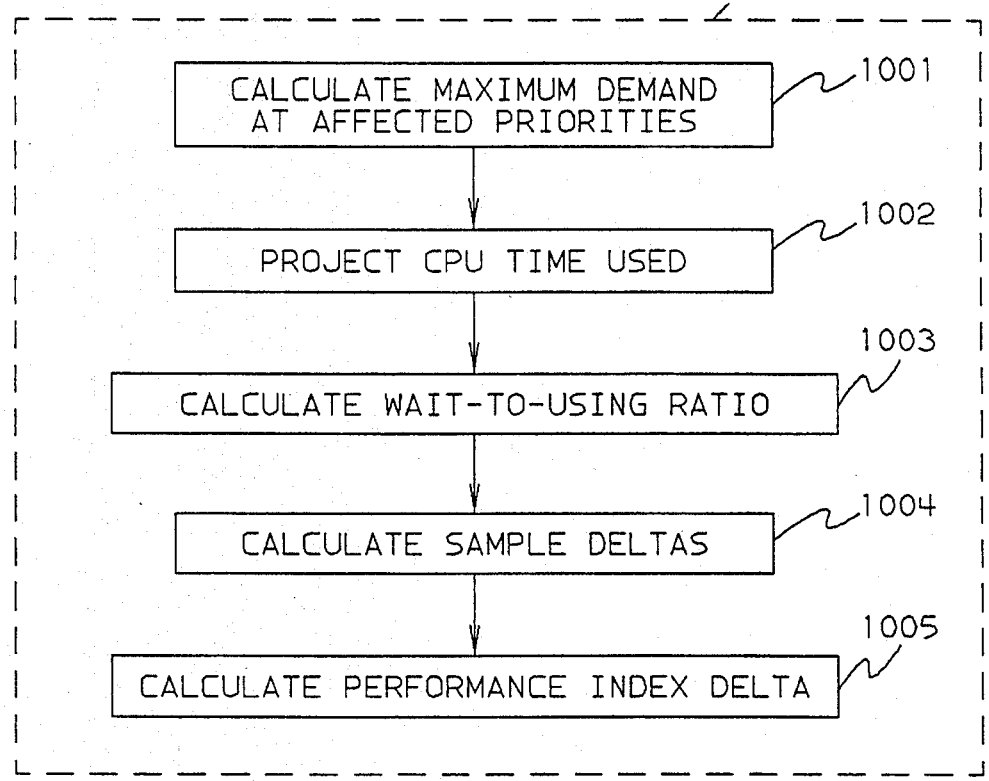
FIG. 10 is a flowchart showing logic flow for projecting the effects of changing dispatching priorities.

Steps (902) through (909) illustrate alternately assessing increasing the receiver's dispatching priority (moving the receiver up) and decreasing the donor's dispatching priority (moving the donor down) until the combination of moves produces sufficient receiver value or insufficient net value. The steps to project the effects of a move (903 and 912) are illustrated in FIG. 10. The net value check is shown in FIG. 8. If either net value check fails, secondary donors and receivers are selected to be moved up with the receiver or down with the donor to determine whether that combination of moves will pass the net value check.

If the combination of moves passes the net value check, secondary receivers and donors are moved along with the primary receiver and donors. Secondary donors and receivers are not found via the select donor function and the select receiver function; instead, secondary receivers are defined as those performance goal classes: 1) having a dispatch priority below the dispatch priority of the primary receiver and, 2) that failed the net value check. Analogously, secondary donors are those performance goal classes: 1) having a dispatch priority above the dispatch priority of the primary donor, and 2) that failed the net value check.

MAXIMUM DEMAND CALCULATION

Maximum demand is calculated as follows:

$$\text{maximum demand percentage} = \frac{(\text{number of work units}) \times (CPU\text{-using samples})}{(\text{total samples}) - (CPU \text{ delay samples})} \times (100)$$

Maximum demand is the theoretical maximum percentage of total processor time a goal class can consume if it has no CPU delay.

ASSESS PRIORITY CHANGES

FIG. 10 illustrates the steps to project the effects of changing dispatching priorities. At 1001, the maximum demand of the performance goal class whose dispatch priority is to be changed is subtracted from its "from" (current) priority and added to its "to" (proposed new) priority. At 1002, the CPU time projected to be used by each class affected by the dispatch priority change is projected by reading from a graph the achievable demand percentage for each class, and then multiplying the achievable demand percentage by the total time available in the system. At 1003 new wait-to-using ratios are projected, at 1004 CPU-using and delay sample deltas are calculated, and at 1005 a performance index delta is calculated for each class affected by the change in dispatch priority.

ACHIEVABLE DEMAND GRAPH

Figure 11:
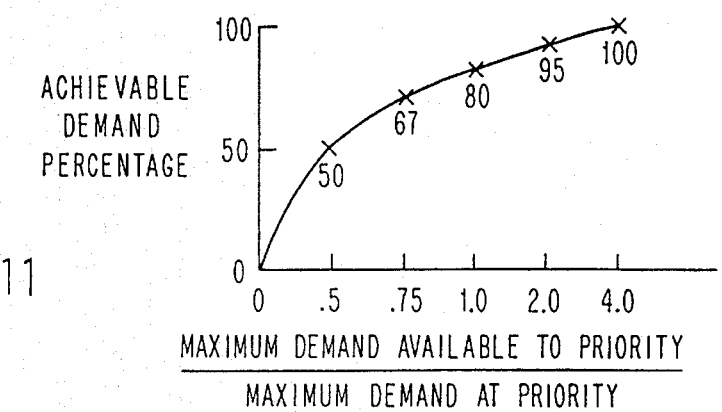
FIG. 11 is a sample graph of achievable demand.

FIG. 11 shows the achievable demand graph. The abscissa value is the quotient of the maximum demand available to a dispatch priority, divided by the total maximum demand at that dispatch priority. The maximum demand available to a dispatch priority is 100 minus the cumulative maximum demand at all dispatch priorities above the subject performance goal class dispatch priority. The maximum demand available to a dispatch priority cannot be less than zero in this calculation. The maximum demand at a dispatch priority is the total maximum demand for all classes at that dispatch priority.

The ordinate value of the achievable demand graph is the achievable demand percentage. The achievable demand percentage is the percentage of the maximum demand of a class that the class is projected to consume, given the maximum demand of all work at higher dispatching priorities and the maximum demand of all work at the same priority.

To project the CPU time to be used, the achievable demand percentage for a class is read off the achievable demand graph. The achievable demand percentage is used to project processor time consumption. CPU time consumption is calculated by multiplying achievable maximum demand by the maximum demand of the class times total CPU time.

The achievable demand graph differs from the others used in the present invention by the fact that all values for this graph are hardcoded. For all the other graphs, observations of real data from the running system are used. The values for the achievable demand graph were derived from modeling.

CPU WAIT-TO-USING RATIO

Figure 12:
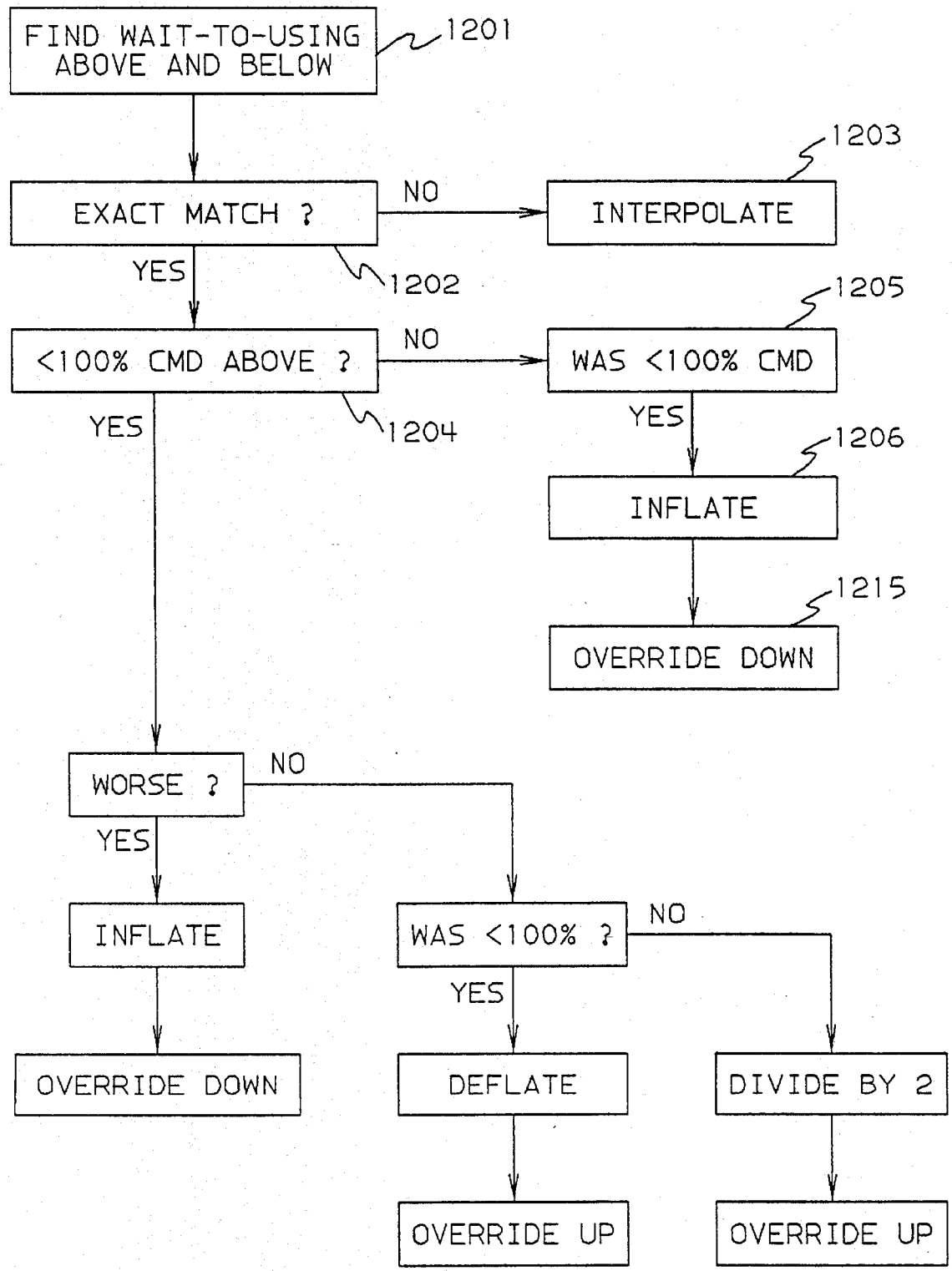
FIG. 12 is a flowchart for calculating a new wait-to-using ratio.

FIG. 12 illustrates calculating a new wait-to-using ratio using the wait-to-using table constructed as described earlier. The actual and projected wait-to-using ratios are used to calculate a new delay sample delta.

At (1201), the wait-to-using ratios at the nearest cumulative maximum above and below the projected cumulative maximum demand at the dispatching priority of interest are found in the wait-to-using table. If an exact match for the new cumulative maximum demand is not found in the table (checked at 1202), the wait-to-using ratios at the maximum demands above and below are interpolated to get the new wait-to-using ratio to use (1203). If an exact match is found, that wait-to-using ratios are adjusted.

If there is projected to be greater than 100% cumulative maximum demand above the dispatching priority of interest (1204), and there was less than 100% cumulative maximum demand (1205), the wait-to-using ratio is inflated by one-half the ratio of maximum demand that could have been consumed and the maximum demand that is projected to be consumed at the dispatching priority (1206).

If there is not projected to be greater than 100% cumulative maximum demand above the dispatching priority of interest (1204), and this cumulative maximum demand is worse than it was projected to be for the current dispatching priority (1207), the wait-to-using ratio is inflated by one-half the ratio of maximum demand that could have been consumed and the maximum demand that is projected to be consumed at the proposed dispatching priority (1208).

If there is not projected to be greater than 100% cumulative maximum demand above the dispatching priority of interest (1204), and this is not worse than it was before (1207), and there was less than 100% cumulative maximum demand above (1210), then the wait-to-using ratio is deflated by the ratio of maximum demand that could have been consumed and maximum demand that is projected to be consumed at the priority (1211).

If there is not projected to be greater than 100% cumulative maximum demand above the dispatching priority of interest (1204), and this demand is not worse than it was for the current dispatching priority (1207), and there was not less than 100% cumulative maximum demand above (1210), the wait-to-using ratio is deflated by dividing it by 2 (1213).

In all inflation cases, if the inflated value is greater than the actual wait-to-using ratio at the next lower priority, then the wait-to-using ratio is overridden to the wait-to-using ratio at the next lower priority. If the deflated value is less than the actual wait-to-using ratio at the next higher priority, the wait-to-using ratio is overridden to the wait-to-using ratio at the next higher priority.

The wait-to-using ratio derived from the wait-to-using table is further adjusted for each individual performance goal class as follows:

$$W2U(\text{adjusted}) = W2U(\text{from table}) \times (A/B)$$

where

A=service-weighted average mean-time-to-wait at priority

B=individual performance goal class mean-time-to-wait

CPU USING SAMPLE DELTA

Figure 13:
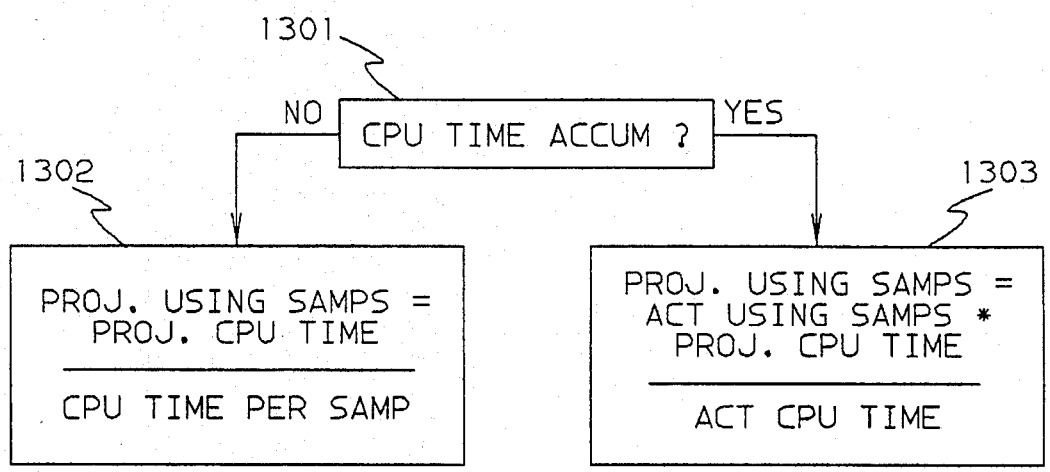
FIG. 13 is a flowchart for calculating CPU time using sample deltas.

FIG. 13 shows the logic flow for calculating CPU-using sample deltas. If the CPU time was accumulated for the performance goal class (checked at 1301), the projected using samples are set equal to the actual using samples times the projected CPU time divided by the actual CPU time (1303). If the CPU time was not accumulated for the performance goal class, the projected using samples are set equal to the projected CPU time divided by the CPU time per sample. The using sample delta is the projected samples minus the actual samples.

$$\text{(projected delay samples)} = \frac{\text{(actual delay samples)} \times \text{(projected wait-to-using)}}{\text{(actual wait-to-using)}}$$

The projected delay samples are equal to the actual observed delay samples times the projected wait-to-using ratio divided by the actual wait-to-using ratio. The delay sample delta is equal to the projected samples minus the actual samples.

CPU PERFORMANCE INDEX DELTA

Performance index deltas are calculated for dispatching priority changes as shown below. Note: these equations go both ways for receivers and donors because the CPU-using and delay sample deltas are signed numbers. response time goals:

$$\text{(proj respsonse time delta)} = \frac{\text{(delay samples delta)} \times \text{(actual response time)}}{\text{(non-idle samples)}}$$

$$\text{(projected performance index delta)} = \frac{\text{(projected response time delta)}}{\text{(goal)}}$$

execution velocity goals:

$$\text{(new velocity)} = \frac{(CPU\text{-using}) + \text{(using delta)}}{\text{(non-idle delta)} + \text{(using delta)} + (CPU \text{ delay delta})}$$

$$\text{(performance index delta)} = \text{(current performance index)} - ((\text{velocity goal})/(\text{new velocity}))$$

MULTIPROGRAMMING LEVEL (MPL) DELAY

This section describes improving performance by reducing the MPL delay experienced by the receiver (121).

ASSESS MPL CHANGES

Figure 14:
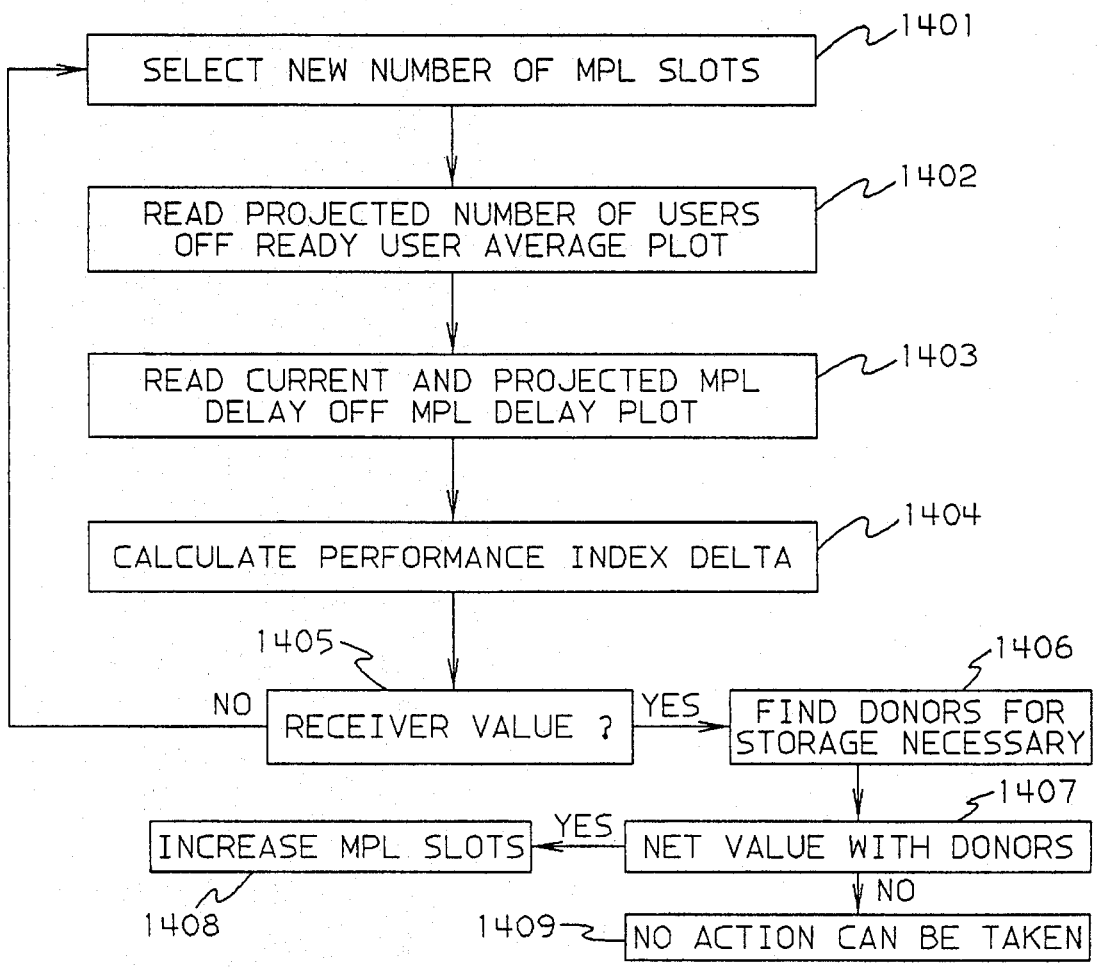
FIG. 14 is a flowchart of the steps to assess improving performance by increasing MPL slots.
Figure 15:
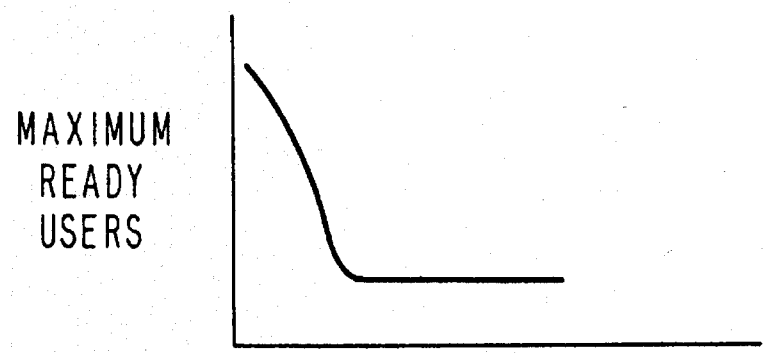
FIG. 15 is a sample graph of ready user average.
Figure 16:
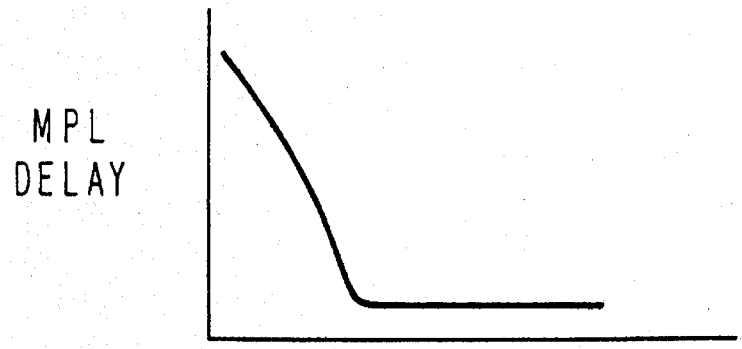
FIG. 16 is a sample graph of MPL delay.

FIG. 14 shows the logic flow to assess improving performance by increasing MPL slots. FIGS. 14–16 provide the steps involved in making the performance index delta projections provided by fix (118) to assess net value (124). At (1401), a new number of MPL slots is selected to be assessed. The number must be large enough to result in sufficient receiver value to make the change worthwhile. Receiver value is checked at (1405). The number must not be so large that the value of the slots is marginal, for example, not more than three times the ready-user average.

At (1402), the projected number of ready users at the new number of MPL slots is read from the ready user average graph shown in FIG. 15. At (1403), the current and projected MPL delays are read from the MPL delay graph shown in FIG. 16. At (1404), the projected performance index delta is calculated. These calculations are shown above.

At (1405), a check is made for sufficient receiver value provided by the additional number of MPL slots. If there is not sufficient receiver value, control returns to (1401) where a larger number of slots is selected to be assessed. If there is sufficient receiver value, at (1406), select donor is called to find donors for the storage needed to give the additional MPL slots to the receiver performance goal class. At (1407), a check is made to ensure there is net value in taking storage from the donors to increase the receiver class MPL slots. If there is net value, the slots are given to the receiver at (1408); otherwise, the receiver goal class MPL delay problem cannot be solved (1409).

READY USER AVERAGE GRAPH

FIG. 15 illustrates the ready user average graph. The ready user average graph is used to predict the number of ready users when assessing an MPL target change. The graph can show the point at which work units will start backing up. The abscissa value is the number of MPL slots available to the service class period. The ordinate value is the maximum number of ready users.

MPL DELAY GRAPH

FIG. 16 illustrates the MPL delay graph. The MPL delay graph is used to assess the value of increasing or decreasing MPL targets for a performance goal class. The graph shows how response time may be improved by increasing MPL slots or how response time may be degraded by reducing MPL slots. The abscissa value is the percentage of ready work units that have an MPL slot available. The ordinate value is the MPL delay per completion.

MPL PERFORMANCE INDEX DELTA

Performance index deltas for MPL increases are calculated as follows:

For response time goals:

$$\text{(performance index delta)} = \frac{\text{(projected } MPL \text{ delay)} - \text{(current } MPL \text{ delay)}}{\text{(response time goal)}}$$

For execution velocity goals:

$$\text{(new velocity)} = \frac{(cpuu) + ((cpuu)/(avg\_in))}{\text{(non-idle)} + ((cpuu)/(avg\_in)) - ((mpld)/(avg\_outr))}$$

$$(pi\_delta) = (current\_pi) - ((goal)/(new\_velocity))$$

where
  CPUU is the CPU-using samples.
  CPUD is the CPU delay samples.
  MPLD is the MPL delay samples.
  Non-idle is the total number of non-idle samples.
  Avg_in is the average number of swapped in address spaces.
  Avg_outr is the average number of swapped out address spaces that are ready to run.

Similar calculations are used to calculate performance index deltas for MPL decreases.

SWAP DELAY

Figure 17:
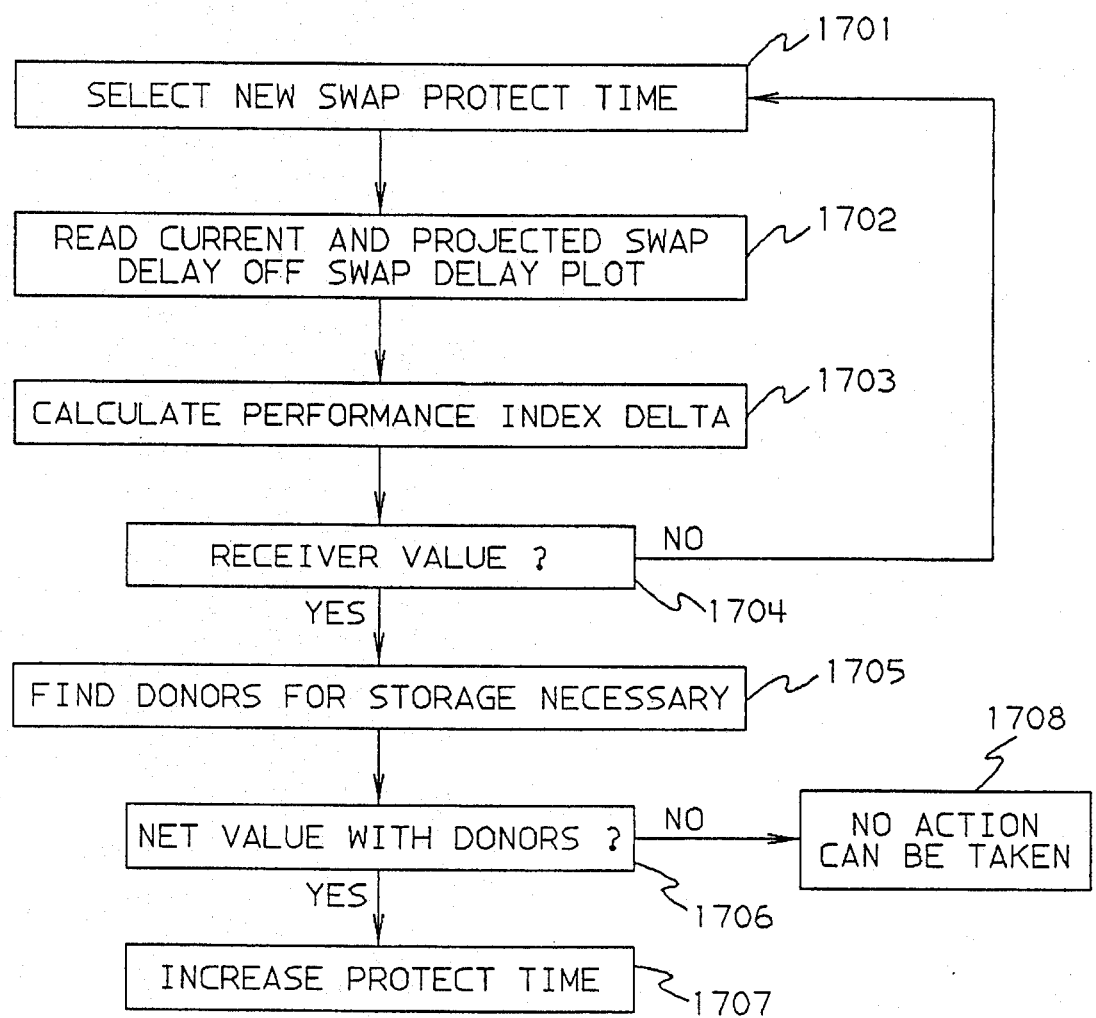
FIG. 17 is a flow chart showing the steps to assess improving a receiver's performance by increasing its swap protect time target.

This section describes improving performance by reducing the auxiliary storage swap delay (130) experienced by the receiver performance goal class. FIGS. 17–18 provide the steps involved in making the performance index delta projections provided by fix (118) to assess net value (124).

ASSESS SWAP PROTECT TIME CHANGES

FIG. 17 illustrates the steps to assess improving a receiver's performance by increasing its swap protect time target (132). At (1701) a new swap protect time is selected to be assessed. The new protect time must not be so large that its value is marginal, for example, not more than the longest time an address space has been swapped into processor storage in the last hour.

At (1702) the current and projected swap delays are obtained from the swap delay graph data, illustrated in FIG. 18. At (1703), the projected performance index delta is calculated. This calculation is done in much the same way as for the MPL fix routine described above.

At (1704) there is a check for sufficient receiver value for the increased swap protect time. If there is not sufficient receiver value, control returns to (1701) where a larger swap protect time is selected to be assessed.

At (1705), the amount of storage necessary to the increase the swap protect time for the performance goal class is calculated, and select donor is called to find donor(s) for the required amount of storage. At (1706) a check is made to ensure that there is net value in taking storage from the donor(s) to increase the receiver performance goal class swap protect time. If there is net value, the receiver's swap protect time is increased at (1707). If there is not net value, no action is taken at (1708).

SWAP DELAY GRAPH

FIG. 18 illustrates the swap delay graph. The swap delay graph is used to assess increasing or decreasing a swap protect time target. The graph shows how response time may be improved by increasing swap protect time or how response time may degraded by reducing swap protect time. Both the abscissa and ordinate values are in milliseconds.

AUXILIARY STORAGE PAGING DELAY

This section describes improving performance by reducing the auxiliary storage paging delay (131) experienced by the receiver performance goal class. FIG. 19 provides the steps involved in making the performance index delta projections provided by fix (118) to assess net value (124).

AUXILIARY STORAGE PAGING FIX ROUTINE

FIG. 19 illustrates the steps to take to reduce a receiver's auxiliary storage paging delay. At (1901) the type of delay is checked. If the delay type is private area auxiliary storage paging delay, control passes to (1902) where the type of performance goal is checked. For performance goal classes with response time that are less than 20 seconds, the auxiliary storage paging delay is addressed by giving every address space the same protective processor storage target. The effect on the performance index of increasing the protective processor storage target for all the address spaces associated with the respective performance goal class is calculated (1903), This calculation is done in much the same way as the other fix routines. The target will be increased enough so there is sufficient receiver value in the action. At (1904), select donor is called to find donor(s) for the necessary storage. At (1905), a check is made to determine whether there is net value in the action. If there is net value, the targets are increased at (1906). If there is not net value, no action is taken at (1907).

Control is passed to (1908) for private area paging delay when the performance goal type is not a short response time goal, and the protective processor storage target of a single address space is increased. The performance index delta is calculated for increasing one address space's protective processor storage target. At (1909), select donor is called to find donor(s) for the necessary storage. At (1910) a check is made to determine whether there is net value in the action. If there is net value, the target is increased at (1911). If there is not net value, no action is taken at (1912). Control is passed to (1913) if the delay type is for auxiliary storage common paging delays and the performance index delta is calculated for increasing common's protective processor storage target. At (1914), select donor is called to find donor(s) for the necessary storage. At (1915) a check is made to determine whether there is net value in the action. If there is net value, the target is increased at (1916). If there is not net value, no action is taken at (1917). Cross memory, VIO and hiperspace delays are processed in a similar fashion.

EXTENSION TO OTHER RESOURCES

The methods and apparatus described in this specification provide for performance goal management. It is an important feature of the present invention that the number of bottleneck delays that can be addressed can be individually added or deleted from the scope of actions driven by the basic invention. For example, delays caused by waiting for I/O, ENQUEUEs, or initiators can be added. Only two things need be done to add a source of delay to the delays addressed: sample the delay so it is added to the analysis of where units of work spend time, and provide a mechanism to assess the effects of addressing that delay. Thus, other delay types and associated fix routines can be added without departing from the spirit and scope of the claimed invention.

What we claim as new is:

1. An apparatus for managing a data processing system workload according to two or more distinct processing goal types, said data processing system workload comprising work units organized into two or more classes, each of said two or more classes having an associated goal falling into one of said goal types, said data processing system comprising at least one central processor, controlled by an operating system, and a storage means attached to said central processor and comprising a stored representation of said associated goals, said apparatus comprising:

a) workload manager means for accessing said associated goals on said storage means and creating goal control data, within a class table means for defining said classes;

b) a system resource manager means for managing system resources according to said associated goals, said system resource manager means comprising:
   i) sampler means for sampling status of said work units and creating sample data;
   ii) Goal Driven Performance Controller (GDPC) means for adjusting one or more system control data elements to cause a change to said status of said work units to effect said associated goals, said GDPC means responsive to said sample data and to said goal control data.

2. The apparatus of claim 1 in which said class table means further comprises two or more importance data elements each defining a relative importance of one of said associated goals.

3. The apparatus of claim 2 in which said GDPC means comprises:
   a) performance index calculation means for calculating a performance index for each of said classes;
   b) select receiver means for selecting a receiver class to be accorded improved service, said select receiver means responsive to said two or more importance data elements and to said calculated performance indexes;
   c) find bottleneck means for identifying a system resource bottleneck affecting said selected receiver class, said find bottleneck means being responsive to said sample data;
   d) fix means for adjusting said system control data elements, said fix means comprising one or more data element adjustment means, each of said data element adjustment means being responsive to said identification of an associated system resource bottleneck by said find bottleneck means and adjusting a particular system control data element associated with said associated system resource bottleneck.

4. The apparatus of claim 3 in which said GDPC means further comprises assess net value means, responsive to said fix means, for assessing net value of a possible change to said particular system control data element and indicating said net value to said fix means.

5. The apparatus of claim 4 in which said GDPC means further comprises select donor means, responsive to said fix means, for selecting a donor class to be accorded degraded service in favor of said selected receiver class.

6. The apparatus of claim 3 in which said system resource bottleneck is identified by said find bottleneck means to be a CPU bottleneck, and in which said fix means comprises adjust dispatch priority means for adjusting donor class dispatch priority and receiver class dispatch priority in response to said identifying of said CPU bottleneck.

7. The apparatus of claim 3 in which said system resource bottleneck is identified by said find bottleneck means to be a Multi-Program Level (MPL) delay, and in which said fix means comprises increase MPL slot means for increasing an MPL slot total in response to said identifying of said MPL delay.

8. The apparatus of claim 3 in which said system resource bottleneck is identified by said find bottleneck means to be an auxiliary storage swap delay, and in which said fix means comprises protect means for increasing swap protect time for said receiver class.

9. The apparatus of claim 3 in which said system resource bottleneck is identified by said find bottleneck means to be an auxiliary storage paging delay, and in which said fix means comprises increase target means for increasing a storage target in response to said identifying by said find bottleneck means.

10. The apparatus of claim 3 in which said fix means further comprises project performance index means for projecting effects of dispatching priority changes on donor and receiver performance indexes.

11. The apparatus of claim 3 in which said fix means further comprises project performance index means for projecting effects of multiprogramming level (MPL) slot changes on donor and receiver performance indexes.

12. The apparatus of claim 3 in which said fix means further comprises project performance index means for projecting effects of swap delay changes on donor and receiver performance indexes.

13. The apparatus of claim 3 in which said fix means further comprises project performance index means for projecting effects of auxiliary storage paging delay changes on donor and receiver performance indexes.

14. A method for managing a data processing system workload according to two or more distinct processing goal types, said data processing system workload comprising work units organized into two or more classes, each of said two or more classes having an associated goal falling into one of said goal types, said data processing system comprising at least one central processor, controlled by an operating system, and a storage means attached to said central processor and comprising a stored representation of said associated goals, said method comprising the steps of:
   a) accessing said associated goals on said storage means and creating goal control data, within a class table means for defining said classes;
   b) managing system resources according to said associated goals by:
      i) periodically sampling status of said work units and creating sample data;
      ii) adjusting one or more system control data elements in response to said sample data and said goal control data to change said status of particular ones of said work units, and so to effect said associated goals for said particular ones of said work units.

15. The method of claim 14 in which said step of adjusting comprises the steps of:
   a) calculating a performance index for each of said classes;
   b) selecting a receiver class to be accorded improved service, in response to two or more importance data elements within said class table means, and to said calculated performance indexes, each of said two or more importance data elements defining a relative importance of one of said associated goals;
   c) in response to said sample data, identifying a system resource bottleneck affecting said selected receiver class;
   d) adjusting at least one or said system control data elements in response to said identifying by said find bottleneck means, said at least one of said system control data elements being associated with said identified system resource bottleneck.

16. The method of claim 15 in which said step of adjusting comprises the step of assessing net value of a possible change to said at least one system control data element prior to said adjusting.

17. The method of claim 15 in which said step of identifying a system resource bottleneck identifies a CPU bottleneck, and in which said at least one system control data element is a dispatching priority data element associated with said donor class.

18. The method of claim 15 in which said step of identifying a system resource bottleneck identifies a Multi-Program Level (MPL) delay, and in which said at least one system control data element is an MPL slot which is added, by said step of adjusting, in response to said step of identifying.

19. The method of claim 15 in which said step of identifying a system resource bottleneck identifies an auxiliary storage swap delay, and in which said at least one system control data element is a swap protect time data element which is increased for said receiver class in response to said step of identifying.

20. The method of claim 15 in which said step of identifying a system resource bottleneck identifies an auxiliary storage paging delay, and in which said at least one system control data element is a storage target which is increased for said receiver class in response to said step of identifying.

21. The method of claim 15 in which said step of adjusting comprises the step of projecting effects of dispatching priority changes on donor and receiver performance indexes.

22. The method of claim 15 in which said step of ajusting comprises the step of projecting effects of multiprogramming level (MPL) slot changes on donor and receiver performance indexes.

23. The method of claim 15 in which said step of adjusting comprises the step of projecting effects of swap delay changes on donor and receiver performance indexes.

24. The method of claim 15 in which said step of adjusting comprises the step of projecting effects of auxiliary storage paging delay changes on donor and receiver performance indexes.

* * * * *